United States Patent [19]

Ragout

[11] Patent Number: 4,467,836
[45] Date of Patent: Aug. 28, 1984

[54] FLEXIBLE TUBE MEANS, ESPECIALLY FOR AN EXPANSIBLE VALVE

[75] Inventor: Bernard Ragout, Aubiere, France

[73] Assignee: Caoutchouc Manufacture et Plastiques, Bezons, France

[21] Appl. No.: 443,643

[22] Filed: Nov. 22, 1982

[30] Foreign Application Priority Data

Nov. 20, 1981 [FR] France .................. 81 21932

[51] Int. Cl.³ .............................................. F16L 55/12
[52] U.S. Cl. ........................................ 138/93; 138/89; 138/109
[58] Field of Search ................... 138/89, 93, 109, 124, 138/125, 126, 127, 130, 138, 140, 153, 172, 174; 285/149, 255

[56] References Cited

U.S. PATENT DOCUMENTS

| | | | |
|---|---|---|---|
| 2,428,189 | 9/1947 | Wolfram | 285/149 |
| 2,610,869 | 9/1952 | Allison | 285/149 |
| 2,809,056 | 10/1957 | Kaiser | 285/149 |
| 3,217,282 | 11/1965 | Chevalier et al. | 285/149 X |
| 4,191,217 | 3/1980 | Kadono et al. | 138/109 |
| 4,413,653 | 11/1983 | Carter | 138/89 |

FOREIGN PATENT DOCUMENTS

| | | | |
|---|---|---|---|
| 885000 | 12/1961 | United Kingdom | 285/149 |
| 511467 | 2/1976 | U.S.S.R. | 285/149 |

*Primary Examiner*—James E. Bryant, III
*Attorney, Agent, or Firm*—Antonelli, Terry & Wands

[57] ABSTRACT

An expandible plug-like device is disclosed for insertion into a conduit for closing or sealing off the conduit. The device has a flexible and elastic hose that is reinforced by at least two reinforcement plies made of flexible metal cables. The hose is secured at least one end of the device by the reinforcement plies being locked or held by rigid closure elements. These elements include an inner support element, an outer support element and a bottom seal sealing element. The inner and outer elements have conical locking surfaces which diverge towards one end of the device and a wedge is arranged between the end edges of the reinforcement plies in order to lock the plies against the support element and the reinforcement element.

10 Claims, 4 Drawing Figures

U.S. Patent   Aug. 28, 1984   Sheet 1 of 2   4,467,836
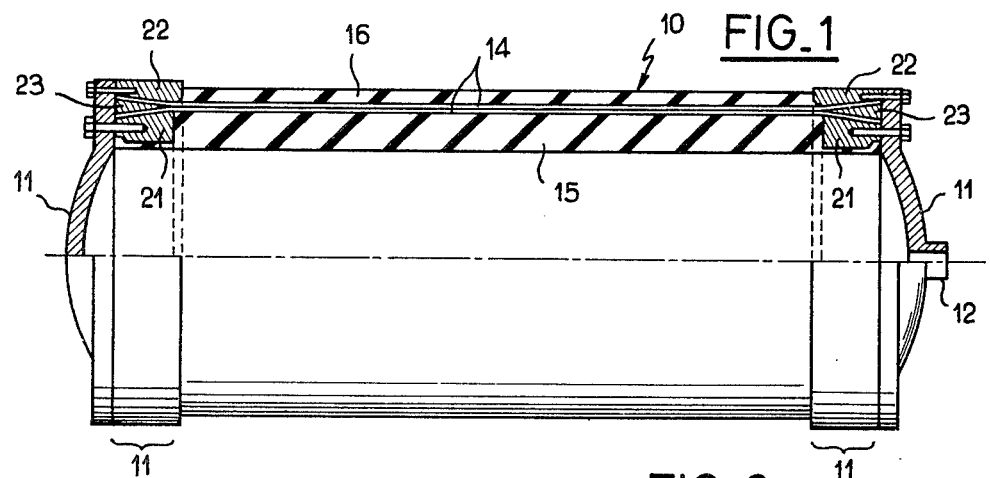
FIG_1
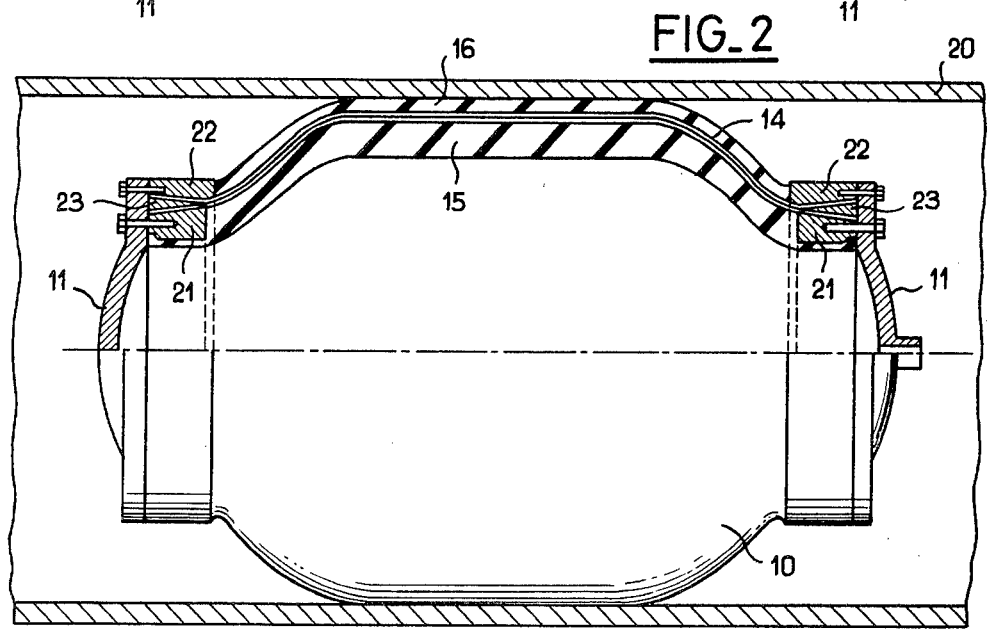
FIG_2
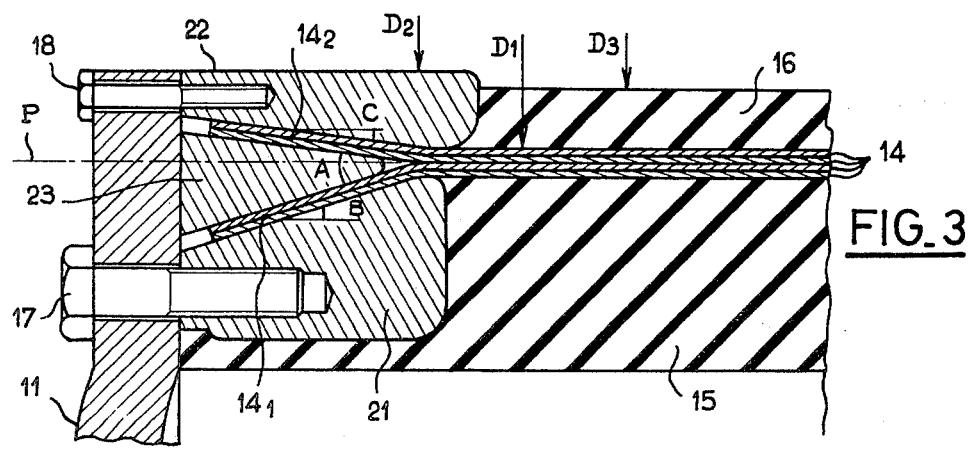
FIG_3

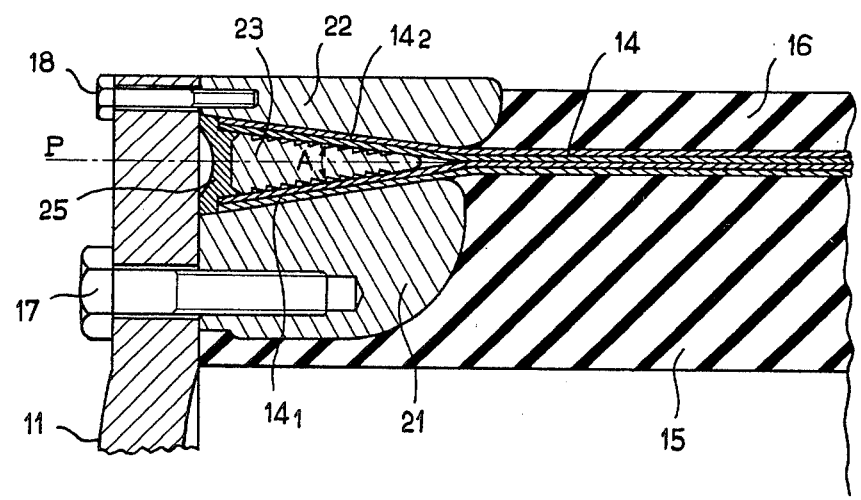
FIG_4

FLEXIBLE TUBE MEANS, ESPECIALLY FOR AN EXPANSIBLE VALVE

BACKGROUND OF THE INVENTION

The invention pertains to flexible and elastic pipes or hoses, the rubber walls of which are reinforced by at least plies or two pairs of plies reinforced with flexible metal cables arranged in a coil; these hoses are fixed, at least at one end, to rigid closing or connection pieces. The invention pertains, more particularly, to devices of the type which comprises a flexible hose which can expand under internal pressure to form an inflatable plug which serves to block conduits to be repaired, wells or other similar applications. For certain uses, for example to block large-diameter conduits such as pipelines or oil wells, it must be possible to inflate the device at very high pressures, which may reach several hundred bars, in order to ensure the tightness of the seal and to resist the axial expulsion force to which it is subjected by the differential pressure between the upstream and downstream sides of the conduit. The severity of these operating conditions poses difficult problems in ensuring satisfactory attachment of the ends of the hoses to the rigid pieces.

For devices of relatively small diameter, i.e., up to 150 to 200 mm, it has been possible to use at the rigid end pieces dummy connectors of the type in which the end of the hose or of its reinforcing plies which are previously stripped bare is locked radially between an inner tip and an outer bushing; the tip and bushing are tubular, coaxial and essentially cylindrical.

For larger diameters and/or for higher pressures, it would be possible to use systems of rigid annular flanges of the type used to connect large-diameter flexible hoses. These annular flanges have the drawback, however, of having an outer diameter which significantly exceeds the diameter of the hose; this is particularly problematical in the case of an inflatable stop plug which must be put into place through poor accesses or is likely to have to pass through bent sections of the pipe or conduit. In addition, these flanges greatly reduce the useful expansion capacity of the hose since the only thing accomplished by the first part of the radial expansion of the hose is to bring this hose up to the diameter of the flanges, and only the expansion of the hose after this point in time can make it possible to push the hose firmly against the inner surface of the conduit to be plugged.

Consequently, the invention is aimed at providing a flexible hose device in which the ends of the hose are attached extremely firmly to rigid end pieces in order to allow the entire assembly to resist very significant forces, especially those resulting from very high pressures.

SUMMARY OF THE INVENTION

More particularly, the goal of the invention is to provide a device in which the hose can be expanded in order to seal conduits, wells and similar applications; in this hose the method of connecting the ends of the hose to the rigid end pieces makes it possible to have rigid end pieces which do not significantly exceed the diameter of the hose in order to make full use of the expansion capacity of this hose. In such a device, at least one end of the hose is secured by locking the ends of its reinforcement plies to a rigid internal support element and to a rigid external reinforcement or hooping element, both of which are coaxial; this device is characterized by the fact that the internal support element and the external reinforcement element exhibit conical locking surfaces which diverge towards the end of the device and by the fact that a wedge with corresponding conical locking surfaces is sunk between the edges of the reinforcement plies against, respectively, the support element and the reinforcement element.

This arrangement makes it possible to ensure excellent fixing of the end of the hose due to the fact that, when in operation, the tension forces exerted on the reinforcement plies of the pipe tend to sink the wedge between the above-mentioned locking surfaces and to ensure self-locking of these reinforacement plies between the surfaces of the internal support element and (external) reinforcement surfaces at the same time. Preferably the peak angle of the cross-section of the wedge should have a small value, on the order of 10–30%, and this angle is divided around the cylindrical area which passes through peak or top angle of the wedge. This makes it possible, in particular, to impart to the rigid end pieces a sufficient cross-section while keeping their diameter at a value which is small and equal to or slightly larger than the diameter of the hose.

BRIEF DESCRIPTION OF THE DRAWINGS

Other characteristics and advantages of the invention are indicated by the detailed description of a practical example, which is illustrated in the attached drawing in which:

FIGS. 1 and 2 are partially cut-away front views on an enlarged scale, showing the attachment of the reinforcement plies to the end pieces.

The device illustrated comprises essentially a hose or tubular cylindrical sleeve made of rubber 10, which is secured at each end to rigid closures which consist of sealed bottoms 11, at least one of which comprises a pressurized fluid intake 12. The rubber wall of hose 10 is reinforced with two plies or two pairs of concentric reinforced plies 14, with each ply being made up of parallel flexible metal cables, preferably made of steel, which are arranged obliquely in a coil at slight angles, on the order of 10°–30° with respect to the generatrices of the pipe. From one ply to the next, the cables are oriented in opposite directions (criss-crossed). The initial angle at which the wires of reinforcement plies 14 are laid determines the maximum expansion factor of hose 10 between its diameter in the free cylindrical state and its diameter in the state when it is expanded under internal pressure. This expansion factor can be approximately 1.5–3, but in operation this expansion is normally limited by the wall of conduit 20 or by the hole to be plugged in such a way as to obtain a high pressure for forcing the hose against this wall. In the examples illustrated, the two plies or two plies of reinforcement plies 14 are laid one on top of the other and very close together, but they could also be separated by an intermediate rubber layer.

According to the invention, the ends of hose 10 are thus attached and secured to the rigid closures. Edges 14.1 and 14.2 of plies 14 (or pairs of plies) are secured between two rigid annular coaxial elements 21-22, one of which forms an internal support and the other which forms an external reinforcement or hooping element; these elements present conical locking surfaces which diverge towards the end of the device. A third rigid annular element 23 in the shape of a wedge is sunk axially between the edges of the two reinforcement plies in such a way as to lock these edges against, respectively, support element 21 and reinforcement hooping element 22. At least support element 21 and possibly the two elements 21, 22 are attached by means of, for example, bolts 17, 18 to corresponding bottom 11, and in this latter case they are made to form a single unit in the axial direction. Wedge 23 is simply supported on bottom 11, which is now in a position where it is locked against the reinforcement plies. It is possible that the locking surfaces of one or more of rigid elements 21-22-23 may exhibit notches, ribs or bumps which are capable of increasing the adherence and attachment between the reinforcement plies and these surfaces.

It is clear that with this arrangement any tensile load exerted reinforcement plies 14 due to the inflation pressure in the expanded position of hose 10 tends to sink or draw the wedge 23 between support 21 and reinforcement 22 and thus to ensure self-locking of edges 14.1 and 14.2 of the plies between the corresponding conical locking surfaces of these elements. This self-locking is due to the small value of the top or peak angle A of wedge-shaped element 23. In practice, this angle A is between approximately 10° and 30° C. The conical locking surfaces of support 21 and reinforcement 22, which are normally parallel to the conical surfaces of the wedge, thus form, between them, an angle equal to A. However, the cylindrical surface area which passes through the to angle of the wedge does not necessarily coincide with the bisectrix of angle A, and the distribution of angle A with respect to this surface area can be such that slope angles B and C made by the conical surfaces of support 21 and reinforcement 22 with the axis of the device are unequal and lie between approximately 5° and 20. Preferably, however, the angle C of the conical area of the reinforcement element 22 should be between 5° and 10°, and it is less than the angle B of conical area of support 21; this makes it possible, in particular, to increase the inner diameter D.1 of reinforcement element 22 (and thus to bring plies 14 close to the outer surface of hose 10) while keeping the outer diameter D2 of the reinforcement element at a value which is essentially equal to or slightly above the outer diameter D3 of the hose and while preserving, for the reinforcement element, a sufficient cross-section for it to mechanically resist the forces resulting from the locking and the stress (can also be "tension") of the plies when the hose is in the expanded position.. In addition, and also in order to promote the deformation of the reinforcement plies 14 and of the rubber during the expansion of hose 10, reinforcement element 22 exhibits an axial length which is at least equal to and preferably slightly in excess of the axial length of the wedge and the axial length of support 21, with a rounded inner connecting edge between its conical suraface and its end face.

With the arrangement written (as in text, should be "described") above, reinforcement plies 14 define, in the wall of rubber hose 10, an external, relatively thin cover 16 and an internal layer or tube 15 which can advantageously be thicker in such a way as to improve the seal and to counteract the creep of the rubber between the wires of reinforcement plies 14 when the device is used at very high pressures. This layer 15 can be extended under support element 21 in such a way as to form a sealing joint against bottom 11. To manufacture the device described above, hose 10 is formed with layers of a rubber mixture and reinforcement plies 14 which are preferably coated with rubber, and rigid elements 21, 22 and 23 are installed in a position for locking reinforcement plies 14. Then the hose is vulcanized in order to ensure that the rubber adheres simultaneously to the reinforcement plies and the rigid end elements; this ensures cohesiveness and excellent sealing of the entire assembly.

The effect of the foregoing is that the device described above can be used both as a sealing plug in conduits or holes which have internal diameters of between approximately the outer diameter D3 of the hose in the unstressed state and the outer diameter of the hose in the state where it is expanded under internal pressure. All other things being equal and in particular in the case of large-diameter devices, the length of the contact surface between the hose and the wall of the conduit or the hole to be plugged can thus be increased.

Depending on the requirements imposed by the applications which arise in practice, it is thus possible to obtain greater resistance to the axial expulsion force (for a required length of the device) or a shorter required length (for a given expansion factor).

The practical example illustrated in FIG. 4 is essentially that of FIG. 3 except for the following special features. The divergent conical locking surfaces or areas of inner support element 21 and outer reinforcement element 22, as well as the corresponding conical surfaces or areas of wedge 23 form an angle A which is distributed symmetrically around the cylindrical area P which passes through the top angle of the wedge. The conical areas of wedge 23 feature notches in order to increase the adhesion and attachment of the edges of reinforcement plies $14_1$, $14_2$.

Wedge 23 is shorter in the axial direction in such a way that its end face is recessed with respect to the end faces of elements 21 and 22. This makes it possible to cause the edges of reinforcement plies $14_1$, $14_2$ to protrude beyond the end face of the wedge and, if necessary, to force the ends of these reinforcement plies against this end face. This arrangement often makes it possible to provide for the presence of a rubber sealing joint 25 in front of the wedge and the edges of reinforcement plies $14_1$, $14_2$ in order to protect them against penetrating moisture.

I claim:

1. An expandable device having a flexible and elastic expandable hose that is reinforced by at least two reinforcement plies made of flexible metal cables and that is secured at at least one end of the device by the reinforcement plies being locked by rigid closure means, said closure means comprising a sealed bottom closure element for closing the one end of the hose, and inner support element and an outer reinforcement element, said inner and outer elements being coaxial and the inner support element being secured to the sealed bottom closure; said support and reinforcement elements having conical locking surfaces which diverge towards the one end of the device and a wedge arranged between end edges of the reinforcing plies to lock the plies against, respectively, the support element and the reinforcement element.

2. A device according to claim 1, wherein said wedge has conical locking surfaces with an apex angle of said surfaces being between 10° and 30° and said angle being divided by a cylindrical surface area P passing through the wedge, said cylindrical surface area P corresponding to a cylindrical surface area generated by the reinforcement plies of said hose.

3. A device according to claim 2, wherein the conical locking surfaces of the wedge are symmetrical with respect to the cylindrical surface area P which passes through the apex angle of the wedge.

4. A device according to claim 2, wherein an angle C made by the locking surfaces of the reinforcement element and the longitudinal axis of the device is between approximately 5° and 20° and said angle C is smaller than an angle B made by the locking surfaces of the support element and the longitudinal axis of the device.

5. A device according to claim 1, wherein said support element and said reinforcement element form a single unit in the axial direction and the wedge is held between these two elements.

6. A device according to claim 1, wherein the outer reinforcement element has an axial length which is equal to or slightly exceeds that of the wedge and the inner support element.

7. A device according to claim 1, wherein the wedge has an axial length which is less than that of the locking surfaces of the inner support element and the outer reinforcement element and the end edges of the reinforcement plies of the hose extend beyond the front face of the wedge.

8. A device according to claim 1, wherein the outer reinforcement element has an outer diameter which is equal to or slightly exceeds that of the flexible hose.

9. A device according to claim 1, wherein the reinforcement plies define, in the wall of the hose, a thin outer cover and a thicker inner sealing tube.

10. A device according to claim 1, wherein said rubber hose is vulcanized after the rigid closure means are installed and locked during the assembly of said device.

* * * * *